Aug. 8, 1933.  S. KERSTEN  1,921,827
WATER FAUCET
Filed May 12, 1930
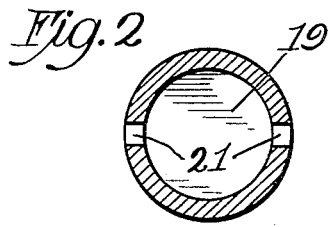
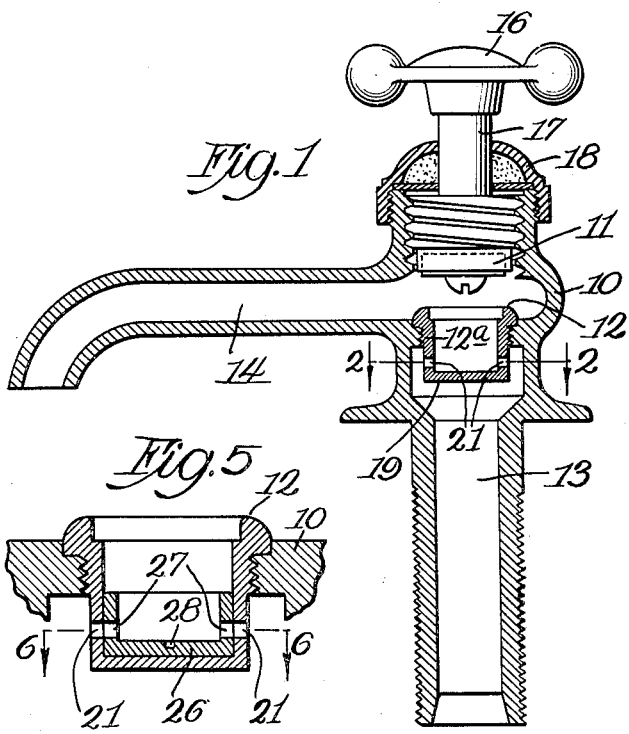
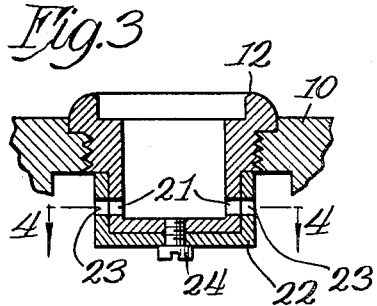
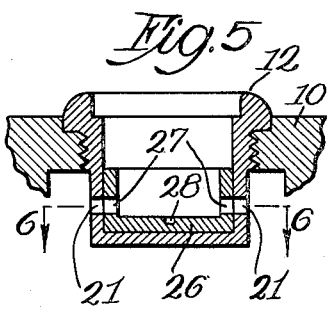
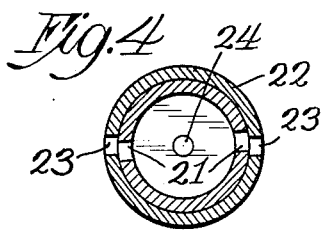
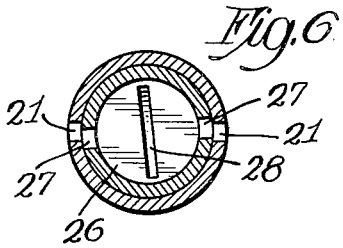
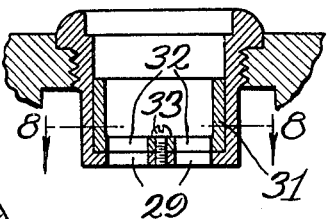
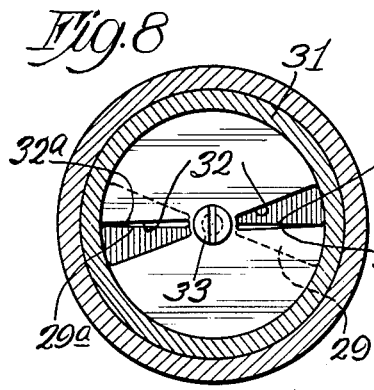
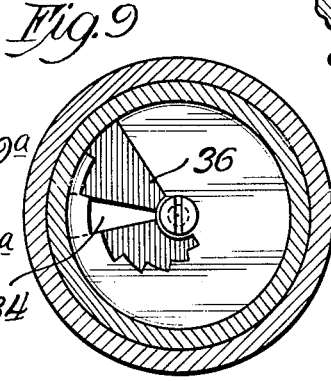
Inventor
Samuel Kersten
By George E. Mueller Atty.

Patented Aug. 8, 1933

1,921,827

UNITED STATES PATENT OFFICE 1,921,827

WATER FAUCET

Samuel Kersten, Chicago, Ill.

Application May 12, 1930. Serial No. 451,564

3 Claims. (Cl. 277—66)

My invention relates in general to water faucets and more in particular to an improved water saving device adapted for use with a water faucet.

The saving of water has become a serious problem in certain sections of the country. Owners of apartment houses supplied with metered water find themselves compelled to pay water bills far in excess of what they would be expected to pay ordinarily, by reason of excessive use of water by occupants of the building. It is obvious that adequate pressure must be supplied to furnish ample water to all sections of the building. Consequently, a relatively high pressure will be available in certain sections of the building, and this naturally results in use of excessive water unless a water saving or pressure regulating system of some type or other is employed.

In my prior Patent No. 1,734,583, I describe one means for effectively regulating the pressure of water at the individual faucets so as to effect a substantial saving in the amount of water used. My present invention is an improvement on the system and device therein shown. In addition to the requirements of owners of large buildings, however, the saving of water is of great importance to the community at large, and governmental bodies are acting to control the actual use of water in private installations in order that the total consumption for a given area may be decreased and kept within the required limits.

The principal object of my present invention is the provision of an improved water faucet.

Another object is the provision of a water faucet having an improved water saving and pressure regulating mechanism.

Another object is the provision of a water saving device for use with a water faucet which is adapted to be regulated in accordance with the water pressure supplied to the faucet.

Other objects and features of the invention will be apparent from a consideration of the following description taken with the accompany drawing, wherein, Fig. 1 is a vertical sectional view showing the faucet of my invention, Fig. 2 is an enlarged fragmentary sectional view taken along the line 2—2 of Fig. 1, Fig. 3 is an enlarged sectional view showing a regulating feature adapted to be used with a faucet of the type shown in Fig. 1, Fig. 4 is a sectional view thereof taken along the line 4—4 of Fig. 3, Fig. 5 is a modified view, Fig. 6 is a sectional view thereof, Fig. 7 is still another modification, Fig. 8 is a sectional view of the modification shown in Fig. 7, and Fig. 9 is a sectional view showing still another form which the invention may take.

In general, my invention consists of the provision of a cup-shaped member disposed in the path of the water and having a sleeve associated therewith adapted to be turned with respect to the cup-shaped member, openings being provided in both members in positions so that they can be brought in full register to supply substantially the full volume of water, or regulated to decrease the flow as much as required. The two members can be so regulated that the flow will be entirely cut off should this be found necessary. In the form of invention herein shown the cup-shaped member carries a removable valve seat, but it may be constructed apart from the valve as can be readily understood by those skilled in the art.

The conventional type of faucet shown in Fig. 1 comprises a faucet body 10, valve mechanism including a valve 11, and valve seat 12, water intake 13 and outlet 14. The valve is operated by a handle 16 having a shank 17 connected thereto, a packing nut 18 of conventional design being screwed to the faucet body. The valve may be entirely removed by first removing the packing nut 18, and subsequently removing the valve assembly itself. Valve seat 12 has an extension 12a of general cylindrical shape provided with exterior threads, by means of which the valve seat is removably secured in the faucet body, threads being supplied in said faucet body for the purpose of receiving the valve seat.

In order to regulate the flow of water to the valve so that only a fraction of the pressure in the water pipe will be effective in the outlet, I provide a water saving feature in connection with the removable valve seat. This is in the form of a cup-shaped member 19 here formed integral with the removable valve seat, and constituting a continuation of the threaded portion 12a. This cup-shaped member is entirely closed with the exception of relatively small openings 21 through which all of the water to be delivered by the faucet passes. In the embodiment of Fig. 1 these openings are two in number and are placed in the side walls of the cup-shaped member, facing each other. When the simple structure of Fig. 1 is employed, the amount of pressure is regulated by controlling the size of the openings 21. In order to do this in this construction it is necessary to remove the entire valve seat assembly which carries the cup-shaped member and supply an assembly in which the cup-shaped member has holes of the proper size. This is done readily by removing the valve stem assembly, the valve seat then being taken out by means of a suitable type of tool.

In Fig. 3 I show a modification in which a sleeve 22 is provided on the outside of the cup-shaped member and has openings 23 capable of being placed in register with the openings in the cup-shaped member by rotating the sleeve upon its central axis and about the cup-shaped member. A set screw 24 is provided for holding the sleeve on the cup-shaped member in the position in which it is placed. The sleeve can be positioned so that the openings are not in full register, for example, in the position shown by the dotted lines in Fig. 4, in which case, the size of the openings, will, in effect, be cut down and less water will be available. For certain purposes it may be desirable to shut off the flow of water entirely at this point, and this can be done readily by turning the sleeve until the openings 21 are entirely closed by the side walls of the sleeve.

In the construction of Fig. 5, a sleeve 26 is employed on the inside of the cup-shaped member, with openings 27 adapted to be placed in register with the openings 21, the same as in the embodiment of Fig. 3. In this arrangement a ground fit may be provided between the members, and the sleeve 26 will hold the position at which it is set without the aid of a set screw, although a screw may be employed therewith if desired. A screw slot 28 is placed on the upper surface of the sleeve so that the flow of water may be adjusted without removing the entire valve seat assembly.

In the embodiments of Figs. 7 and 8, I show how the openings may be provided in the end of the two members instead of the side walls thereof. The cup-shaped member has end openings 29 and a sleeve 31 associated with the cup-shaped member has end openings 32 adapted to be placed in either partial or full register with the openings in the cup-shaped member as shown in Fig. 8, or the openings may be placed entirely out of register so as to cut off the flow of water entirely if desired. These end openings may be of any suitable shape although they are shown in the drawing as of general triangular construction. In this form also, the openings can be entirely closed if it is desired to shut the faucet off entirely without disturbing the supply of water generally to other faucets in the same system. It will be noted that the edge 32a has a different angle than the edge 29a so that when these two edges are close together they are not parallel and do not leave a long narrow slit. In other words, they cross each other so as to leave an opening only partly as long (extending along the radius) as the major opening in each of the members involved. In this embodiment also, a screw 33 is employed to securely fasten the members in the positions to which they have been adjusted.

In the embodiment of Fig. 9 a single triangular opening 34 is provided in the cup-shaped member, while the sleeve has an opening 36 of irregular shape formed by providing a series of triangular openings contiguous to each other, so that a single large opening results. By placing certain sections of the opening 36 in register with the opening 34, the effective water passing opening is modified over a relatively wide range. The smallest portion of the opening 36 is designed to give the minimum flow of water which is apt to be desired; but it is obvious from the construction that only a portion of this smallest section of the opening can be used if desired, or the opening 34 can be closed entirely if necessary.

While I have described the details of my invention so that those skilled in the art will be able to practice the same, I do not restrict myself to the specific forms shown and described, but the invention is limited only by the scope of the appended claims.

What I claim is new and desire to protect by Letters Patent of the United States is:

1. In a water saving faucet, a removable valve seat, and a cup-shaped member integral with the valve seat and forming a part thereof, said cup-shaped member being apertured to permit a restricted flow of water therethrough and past the valve seat and being accessible only by dismantling the faucet whereby the flow of water is restricted during the entire time in which the faucet is in use.

2. In a water saving faucet, a removable valve seat, a cup-shaped member formed integral therewith and having an aperture therein, and a sleeve associated with said cup-shaped member having an opening capable of being placed in full or partial register with said cup-shaped member opening, said sleeve being entirely enclosed within the faucet and accessible only by dismantling the faucet.

3. In a water saving faucet, a faucet body, hand operated valve mechanism for controlling the flow of water from said faucet, and water regulating means for limiting the flow of water through said valve mechanism, said regulating means being entirely within the faucet body in the path of the water and comprising a pair of members having apertures therein, one member being fixed to the faucet body and the other member being adjustable with respect to the fixed member, said second member being adjustable only by dismantling the faucet, whereby the flow of water is restricted during the entire time the faucet is in use.

SAMUEL KERSTEN.